United States Patent
Dudt et al.

(10) Patent No.: US 7,938,053 B1
(45) Date of Patent: May 10, 2011

(54) ARMOR

(75) Inventors: Philip J. Dudt, Rockville, MD (US); George A. Shaw, Warren, MI (US); Patrick T. Smith, Alexandria, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 302 days.

(21) Appl. No.: 12/229,670

(22) Filed: Aug. 19, 2008

(51) Int. Cl.
   *F41H 5/04* (2006.01)
(52) U.S. Cl. .................. 89/36.02; 89/36.08; 428/911
(58) Field of Classification Search .............. 89/36.02, 89/36.08; 428/911
   See application file for complete search history.

(56) References Cited

U.S. PATENT DOCUMENTS

| | | | |
|---|---|---|---|
| 3,520,768 A | 7/1970 | Pelistoecker et al. | |
| 3,666,614 A | 5/1972 | Snedeker et al. | |
| 3,700,534 A | 10/1972 | Cook | |
| 3,917,891 A | 11/1975 | Cooke et al. | |
| 4,125,669 A | 11/1978 | Triebel et al. | |
| 4,328,277 A | 5/1982 | Molari, Jr. | |
| 4,368,226 A * | 1/1983 | Mucaria | 428/34 |
| 4,473,653 A | 9/1984 | Rudoi | |
| 4,529,640 A | 7/1985 | Brown et al. | |
| 4,594,290 A | 6/1986 | Fischer et al. | |
| 4,774,143 A * | 9/1988 | Gondela et al. | 428/442 |
| 5,045,371 A | 9/1991 | Calkins | |
| 5,496,643 A * | 3/1996 | Von Alpen | 428/432 |
| 6,532,857 B1 | 3/2003 | Shih et al. | |
| 7,300,893 B2 | 11/2007 | Barsoum et al. | |
| 2007/0111621 A1 * | 5/2007 | Barsoum et al. | 442/135 |

OTHER PUBLICATIONS

Strategy Page, "Accidental Discovery Aids in EFP Protection", May 29, 2007.
D. Rittel and A. Brill, "Dynamic Flow and Failure of Confined Polymethylmethcrylate", J. Mech.Phys.Solids, vol. 56, Issue 4, Apr. 2008, pp. 1401-1416.

* cited by examiner

*Primary Examiner* — Stephen M Johnson
(74) *Attorney, Agent, or Firm* — Ronald A. Morgan

(57) ABSTRACT

A multi-layer armor comprises: an outer composite spaced from an inner composite. The outer composite comprises (a.) a high strength strike surface layer, (b.) a high strain rate sensitivity-hardening polymer and (c.) a second high strength layer. The inner composite comprises spaced silica glass layers, an acrylic glass layer and a spall liner. In one embodiment the armor is transparent and used to shield a vehicle windshield. In a second embodiment the armor is opaque and is attached to vehicle base armor. The armor may also be applied to a ship. The armor uses commercially available components, is relative inexpensive and is effective.

28 Claims, 1 Drawing Sheet

FIG. 1
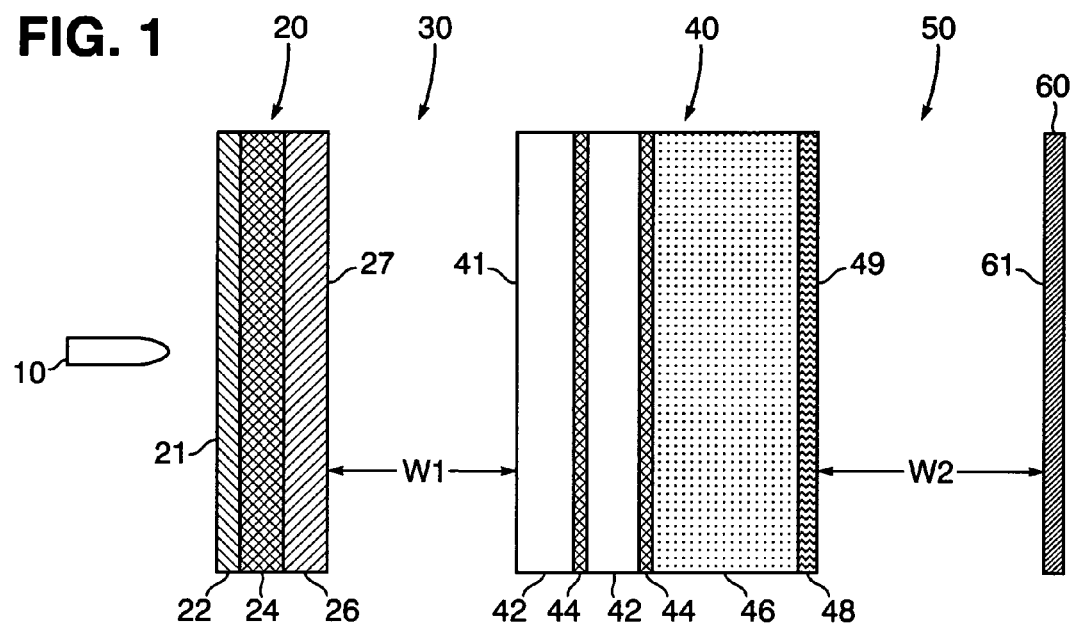
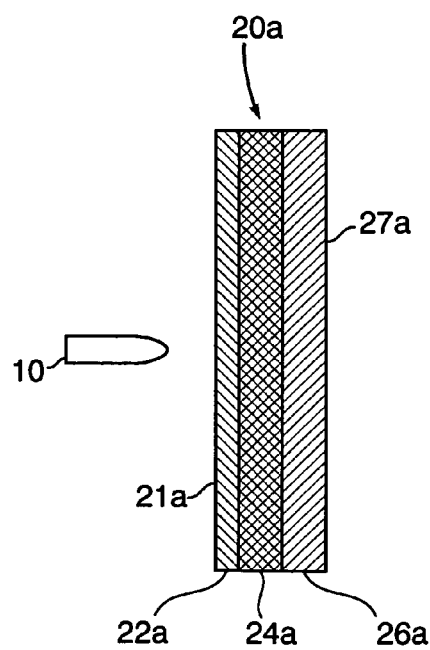
FIG. 1A
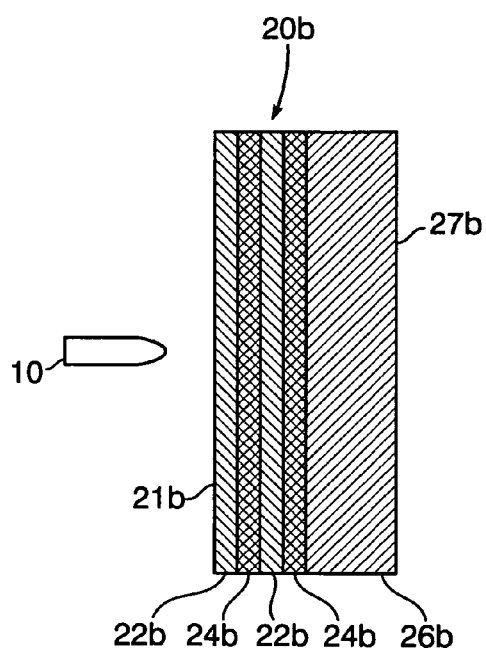
FIG. 1B

ARMOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to armor. More particularly, the invention relates to composite armor having penetration resistant and penetrator neutralizing layers.

2. Discussion of the Related Art

Armor is known for protecting vehicle bodies and windows from bullets, blast fragments and other projectiles of various types including explosively formed projectiles (EFP's) and rocket propelled grenades (RPG's). Conventional steel armor for vehicles is rolled homogeneous plate formulated for strength and toughness. Annealed aluminum plate is also used as vehicle body armor. Silica glass and acrylic glass are components of transparent window armor. Acrylic glass is the polymer poly(methyl methacrylate) also referred to as methyl methacrylate resin.

Conventional steel plate armor has been thickened over time to counter improvements in the penetration effectiveness of projectile. Thickening has increased the weight of the armor up to the weight bearing limit of some military vehicles. Additional steel plate armor cannot be added to a weight limited vehicle. A weight limited vehicle is vulnerable to attack from newly developed penetrators and is also slower and less maneuverable.

There is a need in the art for an armor that is effective against the latest penetrators without adding weight to a military vehicle.

SUMMARY OF THE INVENTION

A composite armor comprises an outer composite spaced from an inner composite. The outer composite comprises at least 2 layers with a confined, high strain rate sensitivity-hardening polymer between the layers. For vehicle body armor the layers are ballistic armor. For transparent armor the layers are silica glass and acrylic glass. The inner composite comprises 1 to 8 spaced silica glass layers followed by an acrylic glass layer.

The multi-layer composites are made from commercially available materials. It is relative inexpensive and effective. In a transparent embodiment, the armor is used to shield windshields and windows of an armored vehicle. In both the transparent and non-transparent embodiments the armor is used for vehicle body panel armor. It is also used to armor a ship.

BRIEF DESCRIPTION OF THE DRAWING

FIG. 1 is a cross-sectional view of multi-layer armor in combination with a base vehicle armor.

FIG. 1A is a cross-sectional view of an alternate embodiment of the first composite shown in FIG. 1.

FIG. 1B is a cross-sectional view of another alternate embodiment of the first composite shown in FIG. 1.

DETAILED DESCRIPTION OF THE INVENTION

The invention is described with reference to the drawing. The drawing discloses a preferred embodiment of the invention and is not intended to limit the generally broad scope of the invention as set forth in the claims. The drawing is schematic and is not drawn to scale.

In FIG. 1, penetrator 10 approaches vehicle base armor 60 at high velocity. The penetrator my be any round that is fired at an armored vehicle, such as a .30 or .50 caliber armor piercing bullet, rocket propelled grenade, explosively formed projectile and the like. For example, an explosively formed projectile travels at a velocity of up to 9000 feet/second. A shaped charge penetrator from a rocket propelled grenade travels at a velocity in the range of 15,000 to 30,000 feet/second. Protecting the vehicle is a composite armor plate comprising, in sequence, an outer composite 20, an optional first air gap 30, and an inner composite 40. The armor plate is attached to vehicle base armor 60 or in front of a vehicle window, preferably with a second air gap 50.

Outer Composite 20—Vehicle Body Armor

Penetrator 10 strikes outer strike surface 21 of outer composite 20. Outer composite 20 comprises, in sequence, high strength strike surface layer 22, high strain rate sensitivity-hardening polymer 24 and second high strength layer 26. Outer composite 20 functions to resist blast, defeat a conventional kinetic energy projectile and slow and deform a high velocity projectile or rocket propelled grenade (RPG) jet.

High strength strike surface layer 22 is a layer of ballistic armor such as surface hardened steel, titanium armor, ceramic, glass and the like. Strike surface layer 22 has the physical characteristics of rolled homogeneous armor such as that produced to U.S. Military Specification MIL-A 12560 and the like. Examples of steel include high carbon content modified steel such as American Iron and Steel Institute (AISI) grade 4340 (Ni—Cr—Mo) steel or 4130 (Cr—Mo) steel. The steel may also be U.S. Military Specification MIL-A 46100 or MIL-A 12560 ballistic armor. Another steel is HY-130 (Ni—Cr—Mn—Mo). A suitable titanium armor is titanium alloy Ti 6Al-4V. These ballistic armors are commercially available in thicknesses of 0.25 inches to 6 inches. The thickness of steel plate is 0.25 to 1 inch. A steel plate thickness of 0.25 to 0.40 inches has been found to be effective and practical. For example, HY-130 (Ni—Cr—Mn—Mo) plate has been found to be effective in a thickness of 0.25 inches. A thickness of 0.25 to 0.40 inches of titanium plate has also been found to be effective. Layer 22 is effective in stopping a projectile and shrapnel and in deforming and slowing a penetrator that succeeds in breaching it.

Polymers have been found that are effective against projectiles. These polymers demonstrate high strain rate sensitivity-hardening when subjected to high rate loading. They become highly rigid when subjected to high rate loading by a projectile. The transient rigidity is significantly increased when the polymer is confined. This physical response creates a transient, very high-strength barrier to a penetrator.

High strain rate sensitivity-hardening polymers include polyurea, polyurethane and mixtures of polyurea and polyurethane. The thickness of high strain rate sensitivity-hardening polymer 24 is 0.1 to 1 inch, preferably about 0.75 inches.

Generally, high strain rate sensitivity-hardening polymers useful for the invention demonstrate a Young's modulus of 1000 psi to 4000 psi when tested at slow strain rates. At high strain rates in the range of 1,000/second to 100,000/second, the confined polymer demonstrates a Young's modulus of 350,000 psi to 500,000 psi or greater. When confined, the tensile strength increases from about 2,000-8000 psi to about 80,000 psi. By way of example, polyurea usefully for the invention is sold commercially under trade names including Carboline® POLYCLAM 707, Air Products VERSALINK® 1000 and SPI POLYSHIELD® Hi-E.

A penetrator 10 breaching strike surface layer 22 and impacts polymer 24 at high velocity, producing high strain rate loading in the range of up to 1,000,000/seconds. Polymer 24 is confined between high strength strike surface layer 22 and second high strength layer 26. As a result, a substantial transient increase in strength and stiffness of polymer 24 is initiated on impact by the penetrator. This provides high resistance to the transit of the projectile through polymer 24. The result is a reduction in the velocity and hence the kinetic energy of the penetrator as it traverses the bulk volume of the polymer.

High strain rate sensitivity-hardening polymers are more fully discussed in inventor's U.S. Pat. No. 7,300,893 for Armor Including A Strain Rate Hardening Elastomer, incorporated herein by reference.

Penetrator 10 exits polymer 24 and strikes second high strength layer 26. Second high strength layer 26 does not receive the initial blast or the initial impact of penetrator 10. This allows for the second high strength layer 26 to be made of a material having less strength than that of the high strength strike surface layer.

The second high strength layer 26 may be an armor of lower grade than the high strength surface layer 22. That is, besides steel, second high strength layer 26 may be an aluminum armor. Aluminum armors include annealed aluminum as well as aluminum alloy having aluminum as a major component with effective alloying amounts of magnesium and manganese.

The thickness of the second high strength layer 26 is preferably about 0.25 to 1.25 inches for steel and preferably about 0.7 to 1.25 inches for aluminum.

The aluminum armor alloys which are most widely accepted for use are alloy 5083 meeting the requirements of U.S. Military Specification MIL-A46027F (MR), and alloy 7039 meeting the requirements of U.S. Military Specification MIL-A46063E. These alloy designations herein are in accordance with alloy numbers and corresponding definitions registered by the Aluminum Association, Washington, D.C.

U.S. Military Specifications have been developed for ballistic performance in terms of the speeds of two types of projectiles. One projectile is an armor piercing (AP) .30 caliber projectile characterized by a pointed leading end. The other projectile is a fragment simulating (FS) 20 mm projectile characterized by a blunt leading end. The blunt end projectile creates spall from the inner side of an armor plate, even when the projectile fails to penetrate the plate. Armor plate of alloy 7039 is superior to armor plate of alloy 5083 for armor piercing (AP) ballistic performance, but less so for (FS) ballistic performance.

Outer composite 20 is assembled by joining high strength surface layer 22, high strain rate sensitivity-hardening polymer 24 and second high strength layer 26. Joining is accomplished by constructing a mold. Layer 22 and layer 26 are positioned in a frame, leaving a space of 0.1 to 1 inches between them to fill with polymer 24. The space may be sealed by taping the sides and bottom of the mold with foam tape of sufficient width to prevent liquid polymer from flowing out. If the panel is to be used to shield a windshield or window, care should be taken to align the two layer surfaces parallel for visual clarity. Fluid polymer is poured or infused into the space left in the mold and then cured. Curing is generally accomplished by holding the materials undisturbed in the frame for about 24 to 72 hours at room temperature. Curing at elevated temperature in an autoclave can be carried out to reduce curing time. This solidifies the polymer without leaving any voids or bubbles and adheres the polymer to both layer 22 and 26 surfaces. As a result the polymer is functionally confined between layer 22 and layer 26 and exhibits the required physical properties of a confined polymer.

Outer Composite 20a and 20b—Visually Transparent

The outer composite assembled to protect windshields and windows, uses visually transparent components. In FIG. 1A, visually transparent outer composite 20a corresponds with outer composite 20 shown in FIG. 1. Penetrator 10 strikes outer surface 21a of outer composite 20a. Outer composite 20a comprises, in sequence, high strength strike surface layer 22a, high strain rate sensitivity-hardening polymer 24a, second high strength layer 26a bounded by back surface 27a. Outer composite 20a is assembled to be visually transparent, to resist blast, to defeat a conventional kinetic energy projectile and to slow and deform a high velocity projectile.

High strength strike surface layer 22a comprises silica glass. The silica glass may be any of the commercially available flat plates. Typically, commercially available silica glass plates are made of soda-lime-silica glass. Borosilicate glass is also commercially available. Depending on the method of forming and heat treating, the glass plate is referred to as plate glass, float glass, tempered glass, or annealed glass. As used herein, the term "silica glass" is intended to refer to all of these glass plates. Silica glass is commercially available in thickness of 0.25 inches and greater. Military silica glass is commercially available in thicknesses up to about 2 inches. It is preferred that the thickness not exceed 1 inch, preferably a thickness of 0.5 inches to 1 inch, for example 0.75 inches.

In outer composite 20a, the second high strength layer 26a is silica glass or acrylic glass. Acrylic glass is the term given to the polymer poly(methyl methacrylate), also referred to as methyl methacrylate resin or PMMA, formed into sheets similar to sheets of silica glass. Acrylic glass is commercially available under the trade names PLEXIGLAS® and PERSPEX® among others. Acrylic glass layer 26a has a thickness of 1 inch to 4 inches, preferably about 2 inches thick.

Outer composite 20a is assembled according to the above-described procedure of outer composite 20. The thickness of high strain rate sensitivity-hardening polymer 24a is 0.1 to 1.0 inches.

An alternate visually transparent outer composite is shown in FIG. 1B. Penetrator 10 strikes outer surface 21b of outer composite 20b. Outer composite 20b comprises, in sequence, two layers of high strength layer 22b, two lamellae of high strain rate sensitivity-hardening polymer 24b and second high strength layer 26b bounded by back surface 27b.

Both layers of high strength layer 22b comprise silica glass. It is preferred that the thickness not exceed 1 inch, preferably 0.5 inches to 1.0 inches. Second high strength layer 26b is acrylic glass. Acrylic glass layer 26b has a thickness of 1 inch to 4 inches, preferably 2 inches. In this alternative there are up to three glass layers and up to three lamellae of high strain rate sensitivity-hardening polymer layer 24b. The thickness of high strain rate sensitivity-hardening polymer 24b may be 0.2 to 0.5 inches. In this alternative with two to three layers of polymer, a thickness for each of about 0.2 inches is effective.

First Air Gap 30

Outer composite 20, 20a or 20b and inner composite 40 are separated by first air gap 30. First air gap 30 is a medial space between the two composites to allow time for the deformation and deflection caused to projectile 10 in the outer composite to more fully develop. That is, high strength strike surface layer 22 and high strength layer 26 deform the shape, cause erosion, cause yaw and reduce the velocity of penetrator 10. First air gap 30 facilitates yaw and deflection of the penetrator so that penetrator fragments emerging from back surface 27, strike surface 41 of inner composite layer 40 with more yaw and at a more oblique and hence less effective attack angle than the initial attack angle of the approaching penetrator on outer composite layer 20. At the same time, the cone of shattered glass fragments ahead of the penetrator spreads laterally in first air gap 30, forming a greater impact diameter on surface 41.

The purpose of the space provided by first air gap 30 is not as a protective armor barrier, but rather to maintain a spaced relationship between the first composite and second composite. The width W1 of first air gap 30 is selected for practical considerations to allow yaw and deflection to more fully develop, without adding weight to the panel. A width W1 of 0 to 8 inches, preferably 2 to 8 inches is effective and 3 to 6 inches is more preferred. The inclusion of first air gap 30 is preferred because it is effective. However, if space limitations do not allow for a panel of greater thickness, it is more effective and therefore preferred to eliminate first air gap 30 rather than the same thickness of glass or confined polymer.

Width W1 of first air gap 30 may be maintained with fasteners, brackets, spacers, or the like. For example, each of the outer composite and the inner composite may be mounted on frames and the frames mounted in boxes on a vehicle. One set of brackets holds the inner composite in place in the box. A second set of brackets holds the outer composite in place in the box. The brackets are spaced from each other to provide an air space width W1 between the inner composite and the outer composite of 0 to 8 inches, preferably 2 to 8 inches, more preferably 3 to 6 inches. In another example, width W1 may be maintained with spacers such as a Kraft paper honeycomb or aircraft aluminum honeycomb. The choice of fasteners is known in the art. The fasteners should be selected to facilitate replacement of a damaged inner composite 20 and outer composite 40.

Inner Composite 40

The remains of penetrator 10 including fragments passing through first air gap 30 strike outer surface 41 of inner composite 40. Inner composite 40 comprises, in sequence, 1 to 8 silica glass layers 42 followed by an acrylic glass layer 46 and optionally by a polycarbonate layer 48. In this drawing, 1 to 8 silica glass layers are represented as 2 layers 42. The silica glass layers 42 and the acrylic glass layer 46 have spaces 44 between them. Inner composite is assembled to defeat any remains of penetrator 10 that have traversed outer composite 20 and have sufficient kinetic energy remaining to penetrate facing surface 41 of inner composite 40.

The silica glass layers 42 of the inner composite 40 are made of the same silica glass material as in inner composite 20. That is, silica glass layers 42 may be any commercially available thickness of silica glass, i.e. plate glass, float glass, tempered glass or annealed glass. It is preferred that the silica glass not exceed 1 inch in thickness, preferably be 0.5 inches to 0.75 inches in thickness based on cost.

Spaces 44 are about 0.1 inches to 0.3 inches wide. Spaces 44 are preferably filled with air. In the alternative, spaces 44 may be filled with the high strain rate sensitivity-hardening polymer applied in outer composite 20. Space 44 is also provided between the last silica glass layer 42 in the series and the acrylic glass layer 48.

The number of silica glass layers 42 and polymer layers 44 may number from 1 to 8, preferably 3 to 7. The number of silica glass layers selected is based on the projectile the panel is intended to defeat.

The mechanism by which silica glass with interspaces defeats a projectile in inner composite 40 is different than the mechanism in the outer composite 20. Silica glass is hard and brittle. On impact, silica glass fractures differently than the metal armor of outer composite. Silica glass fracture begins with both a projectile diameter hole on the impact side of the silica glass and fracture of glass ahead of the projectile within the body of the glass layer out to the exit surface. A conical plug of silica glass is pushed out of the body of the glass layer producing an exit hole larger than the entry hole. The conical plug of shattered glass fragments pushed by the projectile proceeds out of the body of the glass layer to the following space where the glass fragments spread obliquely, increasing the effective projectile diameter. Pushed by the projectile, glass fragments impact the next silica glass layer and repeat the process, forming a larger diameter body of glass fragments pushed by the projectile. The increasing mass of glass fragments wastes kinetic energy by breaking hard silica glass layers with an increasing diameter and pushing the spreading mass of fragments forward. The spaces 44 between the silica glass layers 42 facilitate the lateral spreading of glass fragments, increasing the impact area on the following glass layer and wasting more kinetic energy. At the same time, the hardness of the silica glass further deforms and erodes the projectile, increasing yaw and altering the angle of attack on the following glass surface. The acrylic glass layer is impacted by the body of glass fragments pushed forward by the increasingly deformed projectile. One mechanism by which a penetrator is slowed in acrylic glass by the fragments that are created is referred to as momentum trapping. These fragments carry off kinetic energy when they break away from the armor.

Acrylic glass layer 46 follows silica glass layers 42. The acrylic glass layer 46 receives projectile fragments at a reduced angle of attack proceeded by a mass of glass fragments distributed over an area much greater than the initial cross-sectional area of penetrator 10. Acrylic glass has good impact resistance and penetration resistance. In addition acrylic glass is highly rate sensitive. That is, its modulus and strength increase to retard the penetrator and glass fragment spall. However, on reaching high modulus and strength, acrylic glass becomes brittle, resulting in additional fragments which slow the projectile. The thickness of the acrylic glass is 3 to 10 inches.

In the case of the acrylic glass, it is preferred that the acrylic glass comprise at least 25 volume % of the inner composite 40 to enhance resistance to the glass fragments and the projectile and for momentum trapping. The thickness of acrylic glass chosen above 25 volume % is selected to defeat a specified projectile threat.

This mechanism is distinguished from that of bullet resistant silica glasses such as silica glass-polyurethane, silica glass-polycarbonate and silica glass-acrylic laminates which are known for visual and safety properties.

Inner composite 40 may be backed with polycarbonate layer 48. Polycarbonate is a projectile resisting material with good shock receiving characteristics. In thin sheets, polycarbonate stretches on impact, making it a good spall liner for inner composite 40. In this capacity it prevents traverse of glass fragments and projectile fragments through it. Also, it does not spall as silica glass and acrylic glass do. In general, the polycarbonate material has a thickness of 0.1 to 0.5 inches, preferably 0.1 to 0.3 inches. It has been found that besides the projectile resisting characteristics of the material, it also provides a stiff backing for the composite and may be desirable to make the composite package easier to mount. By way of example, LEXAN® is the trade name of an optically clear polycarbonate sold by SABIC Innovative Plastics.

Outer composite 20 and inner composite 40 are assembled by mounting the layers in a frame or in gaskets. An example is shown in U.S. Pat. No. 3,917,891 for a Fragmentation Shield For Impact Resisting Optical Medium by W. C. Cook et al. incorporated herein by reference.

The thicknesses of the layers in the outer composite and in the inner composite are selected to defeat a specified projectile threat. Particularly in the inner composite, the number of silica glass layers and the thickness of the acrylic glass layer are chosen with a specific threat projectile in mind. However, there are design parameters based on vehicle size and consideration for maneuvering the vehicle. In general, outer composite 20 is assembled to have a thickness of 2 inches to 3.5 inches. First air gap 30 has a thickness W1 of 3 inches to 8 inches. Inner composite 40 has a thickness of 6 inches to 15 inches. Particularly in use for shielding the windshield, the first air gap 30 may be eliminated if space does not allow for it or if greater optical clarity is required.

Using these guidelines, a windshield shielding assembly of outer composite 20, air gap 30 and inner composite 40 has a thickness of 11 inches to 26.5 inches. The limits of 11 inches to 26.5 inches are the practical space and optical clarity limits for use to shield glass in a military vehicle. A windshield shielding panel, side window shielding panels and a back window shielding panel are mounted on a vehicle in front of existing glass with mounting brackets such as those used to mount body armor.

When used as vehicle body armor, the armor panel is mounted on the vehicle 60 and given a second air gap 50 having a width W2 of about 2 inches between the back surface 49 of the panel and the vehicle surface 61. Using these guidelines, an armor panel protrudes 11 inches to 28.5 inches from vehicle surface 61. For maneuvering purposes, a pair of panels increases the width of the vehicle by 22 inches to 57 inches.

For vehicle body armor, surface 49 of inner composite 40 may be adhered directly to surface 61 of base vehicle armor 60. In this alternative, vehicle body armor is mounted on a base vehicle armor so that the effective width of the vehicle is not increased as much. Vehicle body armor is mounted on the vehicle with removable brackets. The armor and brackets are placed inside the vehicle during shipping. The vehicle is loaded on a transport ship under its own power, driven down ramps and around corners to the ship's hold below deck. Aboard ship, space is at a premium. In the hold, vehicles are parked as close possible to one another based on the skill of the loading officer, vehicle drivers and criticality of space. The vehicle is driven off the transport ship at its destination and then driven into the field. The brackets are then attached to the vehicle and the panels mounted on the brackets. In another alternative, the panels may be mounted in boxes on the vehicle The foregoing discussion discloses and describes embodiments of the invention by way of example. One skilled in the art will readily recognize from this discussion, that various changes, modifications and variations can be made therein without departing from the spirit and scope of the invention as defined in the following claims.

What is claimed is:

1. A visually transparent multi-layer armor panel comprising:
    (a.) an outer composite comprising at least 2 visually transparent glass layers and a confined, high strain rate sensitivity-hardening polymer between the layers; and
    (b.) an inner composite comprising:
        (i.) 3 to 7 spaced silica glass layers, and
        (ii.) an acrylic glass layer, followed by
        (iii.) a visually transparent polycarbonate layer having a thickness of 0.1 to 0.3 inches.

2. The visually transparent armor panel of claim 1, additionally comprising a first air gap between the outer composite and the inner composite.

3. The visually transparent armor panel of claim 1, additionally comprising a first air gap between the outer composite and the inner composite and wherein the first air gap has a thickness of 3 to 8 inches.

4. The visually transparent armor panel of claim 1, wherein the outer composite comprises 2 to 4 layers comprising: 1 to 3 silica glass layers followed by 0 to 1 acrylic glass layers, and a confined, high strain rate sensitivity-hardening polymer between the 2 to 4 layers.

5. The visually transparent armor panel of claim 1, wherein the outer composite comprises 2 to 4 layers comprising: 1 to 3 silica glass layers having a thickness of 0.5 to 1 inch, followed by 0 to 1 acrylic glass layers, and a confined, high strain rate sensitivity-hardening polymer between the 2 to 4 layers.

6. The visually transparent armor panel of claim 1, wherein the outer composite comprises 2 to 4 layers comprising: 1 to 3 silica glass layers followed by 1 acrylic glass layer having a thickness of 1 to 3 inches, and a confined, high strain rate sensitivity-hardening polymer between the 2 to 4 layers.

7. The visually transparent armor panel of claim 1, wherein the outer composite comprises 2 to 4 layers comprising: 1 to 3 silica glass layers followed by 0 to 1 acrylic glass layers, and a confined, high strain rate sensitivity-hardening polymer having a thickness of 0.1 to 1 inch between the 2 to 4 layers.

8. The visually transparent armor panel of claim 1, wherein in the inner composite the acrylic glass layer has a thickness of 3 to 10 inches.

9. The visually transparent armor panel of claim 1 wherein the high strain rate sensitivity-hardening polymer is selected from the group consisting of polyurea, polyurethane and a mixture thereof.

10. The visually transparent armor panel of claim 1, wherein in the inner composite the 3 to 7 spaced silica glass layers are spaced from each other by a confined, high strain rate sensitivity-hardening polymer.

11. The visually transparent armor panel of claim 1, wherein in the inner composite, the 3 to 7 spaced silica glass layers are spaced from the acrylic glass layer by a confined, high strain rate sensitivity-hardening polymer.

12. A visually transparent multi-layer armor panel comprising, in order:
    (a.) a 2 to 4 layer outer composite comprising:
        1 to 3 silica glass layers followed by 0 to 1 acrylic glass layers, and a confined,
        high strain rate sensitivity-hardening polymer between the 2 to 4 layers;
    (b.) an inner composite comprising: 3 to 7 spaced silica glass layers followed
        by and spaced there from 1 acrylic glass layer, and wherein: the outer composite has a thickness of 2 to 3.5 inches and the inner composite has a thickness of 6 to 15 inches.

13. The visually transparent multi-layer armor panel of claim 12 additionally comprising a first air gap between the first composite and the second composite.

14. The visually transparent multi-layer armor panel of claim 12 additionally comprising a first air gap between the outer composite and the inner composite and wherein the first air gap has a thickness of 3 to 8 inches.

15. The visually transparent multi-layer armor panel of claim 12 wherein the acrylic glass layer comprises at least 25 vol % of the inner composite.

16. The visually transparent armor panel of claim 12, wherein in the inner composite the 3 to 7 spaced silica glass layers are spaced from each other by a confined, high strain rate sensitivity-hardening polymer.

17. The visually transparent armor panel of claim 12, wherein in the inner composite, the 3 to 7 spaced silica glass layers are spaced from the acrylic glass layer by a confined, high strain rate sensitivity-hardening polymer.

18. An armor panel comprising:
   (a.) an outer composite comprising:
      a first high strength strike surface layer, and a second high strength layer and a confined, high strain rate sensitivity-hardening polymer there between, and
   (b.) an inner composite comprising:
      (i.) 3 to 7 spaced silica glass layers followed by and spaced from,
      (ii.) an acrylic glass layer, followed by
      (iii.) a 0.1 to 0.5 inch thick polycarbonate layer.

19. The armor panel of claim 18, wherein the second, high strength layer has strength less than the strength of the high strength strike surface layer.

20. The armor panel of claim 18, wherein the first high strength strike surface layer is steel armor and the second high strength layer is aluminum armor.

21. The armor panel of claim 18, wherein in the outer composite the polymer is 0.1 to 1 inch thick.

22. The armor panel of claim 18, additionally comprising:
   a first air gap between the outer composite and the inner composite.

23. The armor panel of claim 18, additionally comprising:
   a first air gap between the outer composite and the inner composite, and
   wherein: the first air gap has a thickness of 3 to 8 inches.

24. The armor panel of claim 18,
   wherein in the inner composite the acrylic glass layer has a thickness of 3 to 10 inches.

25. The armor panel of claim 18, wherein the panel is mounted on a vehicle and spaced there from by a second air gap.

26. The armor panel of claim 18 wherein the high strain rate sensitivity-hardening polymer is selected from the group consisting of polyurea, polyurethane and a mixture thereof.

27. The armor panel of claim 18, wherein in the inner composite the 3 to 7 spaced silica glass layers are spaced from each other by a confined, high strain rate sensitivity-hardening polymer.

28. The armor panel of claim 18, wherein in the inner composite, the 3 to 7 spaced silica glass layers are spaced from the acrylic glass layer by a confined, high strain rate sensitivity-hardening polymer.

* * * * *

UNITED STATES PATENT AND TRADEMARK OFFICE
CERTIFICATE OF CORRECTION

| | | |
|---|---|---|
| PATENT NO. | : 7,938,053 B1 | Page 1 of 1 |
| APPLICATION NO. | : 12/229670 | |
| DATED | : May 10, 2011 | |
| INVENTOR(S) | : Philip J. Dudt, George A. Shaw and Patrick T. Smith | |

It is certified that error appears in the above-identified patent and that said Letters Patent is hereby corrected as shown below:

On the Title page after, (74) Attorney, Agent, or Firm,
delete "Ronald A. Morgan"
and insert therefor --Richard A. Morgan--.

Signed and Sealed this
Twenty-first Day of February, 2012

David J. Kappos
*Director of the United States Patent and Trademark Office*